United States Patent
Wang et al.

(10) Patent No.: US 10,341,080 B2
(45) Date of Patent: Jul. 2, 2019

(54) METHOD AND APPARATUS FOR DETERMINING QUANTITY OF CHANNEL QUALITY INDICATORS (CQI)

(71) Applicant: ZTE Corporation, Shenzhen (CN)

(72) Inventors: Yuxin Wang, Shenzhen (CN); Yijian Chen, Shenzhen (CN); Yu Ngok Li, Shenzhen (CN)

(73) Assignee: ZTE Corporation, Shenzhen, Guangdon (CN)

(*) Notice: Subject to any disclaimer, the term of this patent is extended or adjusted under 35 U.S.C. 154(b) by 0 days.

(21) Appl. No.: 15/567,998

(22) PCT Filed: Oct. 19, 2015

(86) PCT No.: PCT/CN2015/092226
§ 371 (c)(1),
(2) Date: Nov. 28, 2017

(87) PCT Pub. No.: WO2016/169235
PCT Pub. Date: Oct. 27, 2016

(65) Prior Publication Data
US 2018/0123772 A1     May 3, 2018

(30) Foreign Application Priority Data

Apr. 20, 2015    (CN) .......................... 2015 1 0188069

(51) Int. Cl.
*H04L 5/14*     (2006.01)
*H04B 7/0417*  (2017.01)
(Continued)

(52) U.S. Cl.
CPC ......... *H04L 5/1461* (2013.01); *H04B 7/0413* (2013.01); *H04B 7/0417* (2013.01);
(Continued)

(58) Field of Classification Search
CPC .. H04B 7/0413; H04B 7/0417; H04B 7/0486; H04B 7/0632; H04B 7/0456;
(Continued)

(56) References Cited

U.S. PATENT DOCUMENTS 8,660,032 B2    2/2014  Dai
8,867,495 B2 *  10/2014  Farajidana ........... H04B 7/0417
                                                  370/252
(Continued)

FOREIGN PATENT DOCUMENTS

CN     101789849 A     7/2010
CN     101820685 A     9/2010
(Continued)

OTHER PUBLICATIONS

International Search Report in international application No. PCT/CN2015/092226, dated Jan. 26, 2016, 2 pgs.
(Continued)

*Primary Examiner* — Tri H Phan
(74) *Attorney, Agent, or Firm* — Cooper Legal Group, LLC

(57) ABSTRACT

Provided are a method and apparatus for determining the quantity of channel quality indicators (CQI). The method comprises: a terminal determining the quantity of ranks or the quantity of CQIs to be fed back according to at least one piece of the following pieces of information: the quantity of ports of a channel state information referenced signal (CSI-RS), the quantity of ports of a downlink demodulation reference signal (DMRS), and a configuration signalling of a base station. The present invention solves the problem of non-matching between CQIs reported by a TDD system under an FD-MIMO and CQIs actually needing to be used in the related art, improves the reliability of downlink
(Continued)

transmission, saves overheads of a downlink signalling, and improves the downlink transmission performance.

12 Claims, 6 Drawing Sheets

(51) Int. Cl.
*H04L 5/00* (2006.01)
*H04B 7/0413* (2017.01)
*H04W 24/10* (2009.01)
*H04W 92/10* (2009.01)
*H04B 7/06* (2006.01)
*H04B 7/0456* (2017.01)

(52) U.S. Cl.
CPC ......... *H04B 7/0456* (2013.01); *H04B 7/0632* (2013.01); *H04B 7/0689* (2013.01); *H04L 5/005* (2013.01); *H04L 5/0051* (2013.01); *H04L 5/0057* (2013.01); *H04W 24/10* (2013.01); *H04W 92/10* (2013.01); *H04B 7/0486* (2013.01); *H04L 5/0094* (2013.01); *H04L 5/1469* (2013.01)

(58) Field of Classification Search
CPC ......... H04B 7/0689; H04L 5/00; H04L 5/005; H04L 5/0051; H04L 5/0057; H04L 5/0094; H04L 5/14; H04L 5/1461; H04L 5/1469; H04W 24/10; H04W 40/12; H04W 92/10
See application file for complete search history.

(56) References Cited

U.S. PATENT DOCUMENTS

| | | | | |
|---|---|---|---|---|
| 8,929,476 | B2* | 1/2015 | Dai | H04L 1/0031 370/329 |
| 9,113,487 | B2 | 8/2015 | Nammi | |
| 9,363,700 | B2* | 6/2016 | Su | H04W 24/10 |
| 9,998,194 | B2* | 6/2018 | Guo | H04L 1/0026 |
| 2010/0238824 | A1* | 9/2010 | Farajidana | H04B 7/0417 370/252 |
| 2012/0320774 | A1 | 12/2012 | Dai | |
| 2013/0250879 | A1* | 9/2013 | Ng | H04W 72/042 370/329 |
| 2013/0343216 | A1* | 12/2013 | Su | H04W 24/10 370/252 |
| 2014/0177545 | A1 | 6/2014 | Nammi | |
| 2015/0189644 | A1 | 7/2015 | Lorca Hernando | |
| 2015/0249511 | A1 | 9/2015 | Chen | |
| 2015/0327247 | A1* | 11/2015 | Chen | H04W 52/0251 370/329 |
| 2015/0341092 | A1 | 11/2015 | Park et al. | |
| 2016/0050006 | A1 | 2/2016 | Ko et al. | |
| 2017/0294945 | A1* | 10/2017 | Liu | H04B 7/0626 |
| 2018/0054244 | A1* | 2/2018 | Kim | G01S 7/52095 |
| 2018/0083681 | A1 | 3/2018 | Faxer et al. | |

FOREIGN PATENT DOCUMENTS

| | | | |
|---|---|---|---|
| CN | 102291213 | A | 12/2011 |
| CN | 103391124 | A | 11/2013 |
| CN | 103460634 | A | 12/2013 |
| EP | 2410684 | A1 | 1/2012 |
| EP | 2810508 | A1 | 12/2014 |
| WO | 2011126025 | A1 | 10/2011 |
| WO | 2011144131 | A1 | 11/2011 |
| WO | 2013171152 | A1 | 11/2013 |
| WO | 2014129858 | A1 | 8/2014 |
| WO | 2014171658 | A1 | 10/2014 |
| WO | 2016122395 | A1 | 8/2016 |

OTHER PUBLICATIONS

English Translation of the Written Opinion of the International Search Authority in international application No. PCT/CN2015/092226, dated Jan. 21, 2016, 6 pgs.

Supplementary European Search Report in European application No. 15889718.1, dated Apr. 18, 2018, 14 pgs.

CMCC: "Evaluation of feedback based on hybrid RS", Apr. 2015, R1-152036, 3GPP TSG RAN WG1 Meeting #80bis, Document for: Discussion and Decision, Retrieved from the Internet: URL: http://www.3gpp.org/ftp/Meetings_3GPP_SYNC/RAN1/Docs/[retrieved on Apr. 19, 2015], 4 pgs.

Samsung: "Discussions on tradeoff of CSI-RS and feedback enhancement", Apr. 2015, R1-151638, 3GPP TSG RAN WG1, Meeting #80bis, Document for: Discussion and Decision, Retrieved from the Internet: URL: http://www.3gpp.org/ftp/Meetings_3GPP_SYNC/RAN1/Docs/[retrieved on Apr. 19, 2015], 8 pgs.

"CSI Reference Signal Multiplexing Using Carrier Frequency Swapping for FDD High-Order MIMO SDM", Sep. 2014, M. Sawahashi, T. Kawamura and Y.Kakishima, IEEE 80th Vehicular Technology Conference (VTC Fall), 5 pgs.

"An Enhanced Interference Measurement Scheme for CoMP in LTE-Advanced Downlink", Jun. 2013, Wei Xi, Xiang Yun, Satoshi Nagata, Yoshihisa Kishiyama and Lan Chen, IEEE International Converence on Communications (ICC), pp. 4870-4874.

"Precoded SRS for LTE-Advanced", May 2009, 3GPP TSG RAN WG1 Meeting #57, R1-091738, Panasonic, 6 pgs.

"CQI for R11 CoMP with CRS and CSI-RS based feedback", Nov. 2011, 3GPP TSG-RAN WG! Meeting #67, R1-114318, Nokia Siemens Networks, Nokia, 2 pgs.

"CQI definition for TDD CoMP", Aug. 2012, 3GPP TSG RAN WG1 Meeting #70, R1-123379, ZTE, 4 pgs.

* cited by examiner

METHOD AND APPARATUS FOR DETERMINING QUANTITY OF CHANNEL QUALITY INDICATORS (CQI)

TECHNICAL FIELD

The present disclosure relates to the field of communications, and in particular to a method and device for determining the number of Channel Quality Indicators (CQI).

BACKGROUND

In a Long Term Evolution (LTE) system, pilot measurement and data demodulation is performed by using a Common Reference Signal (CRS). That is, all users use the CRS to perform channel estimation. In case of precoding processing based on the CRS, a transmitting terminal is required to notify a receiving terminal of a specific precoding matrix (also called a precoding weight) for data transmission, which requires a high pilot overhead. Moreover, in a Multi-User Multi-Input Multi-Output (MU-MIMO) system, since multiple terminals use the same CRS, pilots cannot be orthogonal and thus interference cannot be estimated.

In an Advanced Long Term Evolution (LTE-A) system, for reducing the pilot overhead and improving the accuracy of channel estimation, a pilot measurement function is separated from a data demodulation function. Two types of reference signals are defined respectively, i.e., a Demodulation Reference Signal (DMRS) and a Channel State Information Reference Signal (CSI-RS). The CSI-RS is mainly used to perform channel measurement to obtain and feed back Channel Quality Information (CQI). Therefore, a base station side can utilize the information to complete user scheduling and implement adaptive allocation of a Modulation and Coding Scheme (MCS). Precoding information is not carried in the transmission of the CSI-RS. The DMRS is mainly used to perform channel estimation on a Physical Downlink Shared Channel (PDSCH) and an enhanced Physical Downlink Control Channel (ePDCCH). Therefore, complete demodulation of a data/control channel can be achieved. The precoding information of the corresponding PDSCH/ePDCCH is carried in the transmission of the DMRS. The LTE system and the LTE-A system can be divided into a Frequency Division Duplex (FDD) system and a Time Division Duplex (TDD) system depending on the difference between an uplink duplex mode and a downlink duplex mode. The pattern of the CSI-RS and the DMRS of the FDD system may be different from that of the TDD system.

In the LTE system and the LTE-A system, a radio frame includes frame structures in an FDD mode and a TDD mode. Link adaptation adopts a method of combining Inner Loop Link Adaptation (ILLA) and Outer Loop Link Adaptation (OLLA). The ILLA first takes charge of selecting an appropriate MCS for a User Equipment (UE). The selection is based on a mapping relationship between a measured Signal to Interference plus Noise Ratio (SINR) and the most appropriate scheme allocated. For a variety of reasons, the ILLA is not always well adapted to the channel (e.g. fast channel change), and thus a function of OLLA is necessary. The OLLA aims to achieve a target Block Error Rate (BLER) by adjusting the MCS, for example, the BLER is equal to 0.1 in the LTE system. The base station can determine the current BLER by performing statistics on a Hybrid Automatic Repeat Quest Acknowledgement (HARQ-ACK) fed back by the UE. Therefore, the method is based on HARQ-ACK feedback information of the first transmission of an HARQ.

In the LTE system and the LTE-A system, control signaling to be transmitted on an uplink has Acknowledgement/Negative Acknowledgement (ACK/NACK) and three forms for reflecting downlink Channel State Information (CSI). The three forms are a CQI, a Precoding Matrix Indicator (PMI) and Rank Indicator (RI). In the version Rel-11 of the LTE-A system, the base station can configure multiple CSI processes for the UE. The UE feeds back multiple CSIs based on the configuration of each CSI process.

The CQI plays a key role in a link adaption process. The CQI is a message sent to the eNodeB by the UE, and is used for describing downlink channel quality of the current UE. The UE can measure a reference signal sent by the base station, and then obtain the CQI by calculating.

The CQI is an indicator for measuring the downlink channel quality. In the protocol 36-213, the CQI is represented by an integer from 0 to 15, representing different CQI levels. Different CQIs correspond to their own MCSs, as shown in FIG. 1. The selection of CQI level should follow the guidelines as follows.

The selected CQI level should make the BLER, under the corresponding MCS, of a PDSCH transmission block corresponding to the CQI not exceed 0.1.

Each serial number of the CQI corresponds to a modulation mode and a transmission block size. The corresponding relationship between the transmission block size and NPRB is shown in Table 1. The CQI in the table is 4 bits. A code rate can be calculated according to the transmission block size and NPRB size.

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

The Massive MIMO technology is a key enhancement technology in the next-generation communication technology. The main characteristics of a Massive MIMO system are as follows. A Massive antenna array is configured at the base station side, in which more than 8 antennas may be adopted to perform transmission. For example, 16 antennas, 32 antennas, 64 antennas, or even more antennas may be used to perform transmission. The transmission in case of more than 8 antennas is the Massive MIMO technology. Using such a massive multi-antenna technology is beneficial to reducing the interference between user channels. On the other hand, a large array can also bring an appreciable array gain and diversity gain. If multiple antennas are arranged on a vertical plane to form a planar array to perform transmission, the space of base-station antenna can be utilized effectively to place multiple antennas in a small space.

Thereby, a horizontal gain of Massive MIMO as well as a vertical gain of Massive MIMO can be obtained. This is the 3 Dimensional Massive MIMO (3D Massive MIMO) technology or the Full Dimensional MIMO (FD-MIMO) technology.

In the current TDD LTE/LTE-A system, when the UE is configured to be a downlink transmission mode 8, a downlink transmission mode 9 or a downlink transmission mode 10, the CSI process is configured to not need the feedback of PMI/RI, and the UE only needs to feed back the CQI to the base station. The CQI is obtained based on the assumption that the base station adopts the downlink transmission mode of transmission diversity. Therefore, the UE can only feed back the CQI of a codeword stream. However, the downlink transmission actually adopted by the base station may be spatial multiplexing of multiple codeword streams, so there is a problem of non-matching between the CQI fed back by the UE and the actual downlink transmission mode. In the related art, in order to solve this problem, the base station estimates a gain of downlink multi-stream spatial multiplexing compared to the transmission diversity, and then adjusts the CQI fed back. However, in the FD-MIMO technology, with the increase of the number of transmitting antennas, it becomes more and more difficult to solve the problem of non-matching of CQIs in the related art.

Aiming at the problem of non-matching between the CQIs reported by the TDD system under the FD-MIMO technology and the CQIs actually needed in the related art, an effective solution has not been presented yet.

SUMMARY

The disclosure is mainly intended to provide a method and device for determining the number of CQIs, so as to at least solve the problem of non-matching between CQIs reported by a TDD system under the FD-MIMO technology and CQIs actually needed in the related art.

According to an aspect of the disclosure, a method for determining the number of CQIs is provided. The method includes the following step. A terminal determines the number of ranks or the number of CQIs to be fed back according to at least one of the following pieces of information: the number of CSI-RS ports, the number of downlink DMRS ports, and configuration signaling of a base station.

Optionally, the method further includes the following steps. The terminal feeds back CSI based on the number of ranks, or calculates the CSI, or determines the number of CQIs to be fed back.

Optionally, the method further includes the following step. The terminal feeds back the number of ranks to the base station.

Optionally, the method further includes the following step. The terminal determines performing the operation of determining the number of CQIs to be fed back based on the number of ranks according to a configuration of the base station or pilot types of CSI-RS. The pilot types include: a precoding pilot and a non-precoding pilot.

Optionally, the step of determining, by the terminal, the number of CQIs based on the number of ranks includes the following steps. When the number of ranks is k, the terminal determines the number of CQIs to be fed back as 1. When the number of ranks is one of other values except k, the terminal determines the number of CQIs to be fed back as 2. Where k is an integer between 1 and ceil(N/2), including 1 and ceil(N/2), N is the number of physical antennas at the base station side, and ceil( ) is a ceiling function. Alternatively, when the number of ranks is k, the terminal determines the number of CQIs to be fed back as 1. When the number of ranks is an integer between k+1 and ceil(N*2/3), including k+1 and ceil(N*2/3), the terminal determines the number of CQIs to be fed back as 2. When the number of ranks is an integer between ceil(N*2/3)+1 and ceil(N), including ceil(N*2/3)+1 and ceil(N), the terminal determines the number of CQIs to be fed back as 3. Where k is an integer between 1 and ceil(N/2), including 1 and ceil(N/2), N is the number of physical antennas at the base station side, and ceil( ) is the ceiling function.

Optionally, the method further includes the following steps. The terminal performs the operation of determining the number of ranks or the number of CQIs to be fed back based on the information according to an agreement between the base station and the terminal or the configuration of the base station.

Optionally, the step of determining, by the terminal, the number of ranks includes the following steps. The terminal determines the number of ranks based on an agreed rule that the number of ports is equal to the number of ranks, according to the number of ports and/or a mapping relationship and/or a mode selected by the terminal.

Optionally, the step of determining, by the terminal, the number of ranks and/or the number of CQIs to be fed back according to the pilot types of CSI-RS includes the following steps. When the type of CSI-RS is precoded CSI-RS, the terminal determines the number of ranks and/or the number of CQIs to be fed back according to the number of CSI-RS ports, and calculates the CQI based on the assumption that spatial multiplexing is adopted on a downlink. When the type of CSI-RS is non-precoded CSI-RS, the terminal determines the number of ranks and/or the number of CQIs to be fed back as 1, and calculates the CQI based on the assumption that a transmission diversity mode is adopted on the downlink. Alternatively, the terminal calculates the CQI and the number of feedback ranks based on the CSI-RS.

Optionally, the method further includes the following step. The terminal determines the number of ranks and/or the number of CQIs to be fed back according to a system duplex mode.

Optionally, the step of determining, by the terminal, the number of CQIs to be fed back according to the number of CSI-RS ports or the number of DMRS ports includes the following steps. When the number of CSI-RS ports or the number of DMRS ports is k, the terminal determines the number of CQIs to be fed back as 1. When the number of CSI-RS ports or the number of DMRS ports is one of other values except k, the terminal determines the number of CQIs to be fed back as 2. Where k is an integer between 1 and ceil(N/2), including 1 and ceil(N/2), N is the number of physical antennas at the base station side, and ceil( ) is the ceiling function. Alternatively, when the number of CSI-RS ports or the number of DMRS ports is k, the terminal determines the number of CQIs to be fed back as 1. When the number of CSI-RS ports or the number of DMRS ports is an integer between k+1 and ceil(N*2/3), including k+1 and ceil(N*2/3), the terminal determines the number of CQIs to be fed back as 2. When the number of CSI-RS ports or the number of DMRS ports is an integer between ceil(N*2/3)+1 and ceil(N), including ceil(N*2/3)+1 and ceil(N), the terminal determines the number of CQIs to be fed back as 3. Where k is an integer between 1 and ceil(N/2), including 1 and ceil(N/2), N is the number of physical antennas at the base station side, and ceil( ) is the ceiling function.

Optionally, the method further includes the following steps. The terminal sends a Sounding Reference Signal (SRS) and/or the CQI, to the base station; and the base station determines the number of CQIs to be fed back by the terminal, according to the SRS and/or the CQI.

Optionally, the number of CSI-RS ports or the number of downlink DMRS ports indicates a maximum number of ranks which can be reported by the terminal.

Optionally, each rank corresponds to a group of configuration parameters of the CSI-RS. The configuration parameters of the CSI-RS include: indexes of CSI-RS ports and the number of CSI-RS ports.

Optionally, the number of downlink DMRS ports is indicated by a 3-bit antenna port, a scrambling identifier and the number of ranks which are carried in downlink control signaling.

According to another aspect of the disclosure, a method for determining the number of CQIs, a CQI calculation and an RI calculation is provided. The method includes the following steps. The terminal determines the number of CQIs to be reported by a UE, and the RI/CQI calculation according to at least one of the following pieces of information: the number of CSI-RS ports, configuration signaling of the base station, a system duplex mode, and pilot types.

Optionally, the pilot types of CSI-RS include the precoding pilot and the non-precoding pilot.

Optionally, the configuration signaling of the base station includes that: the base station independently configures determination of the number of CQIs and/or determination of the CQI calculation and/or determination of the RI calculation for multiple CSI processes.

Optionally, the system duplex mode include: the duplex mode of the FDD system and the duplex mode of the TDD system.

Optionally, determining the CQI calculation includes the following steps. the CQI is calculated based on the assumption that the spatial multiplexing is adopted on the downlink. The CQI is calculated based on the assumption that the transmission diversity is adopted on the downlink.

Optionally, determining the CQI calculation includes the following steps. When the type of CSI-RS is the precoded CSI-RS, the terminal determines the number of ranks and/or the number of CQIs to be reported by the UE according to the number of CSI-RS ports, and calculates the CQI based on the assumption that the spatial multiplexing is adopted on the downlink. When the type of CSI-RS is the non-precoded CSI-RS, the terminal calculates the CQI based on the assumption that the transmission diversity mode is adopted on the downlink.

Optionally, determining the CQI calculation includes the following steps. When the system that the terminal accesses is the TDD system and the type of CSI-RS is the precoded CSI-RS, the terminal determines the number of ranks and/or the number of CQIs to be reported by the UE according to the number of CSI-RS ports, and calculates the CQI based on the assumption that the spatial multiplexing is adopted on the downlink.

Optionally, determining the RI calculation includes the following steps. The terminal configures that each rank corresponds to a group of configuration parameters of the CSI-RS. The configuration parameters of the CSI-RS include: the indexes of CSI-RS ports and the number of CSI-RS ports.

According to another aspect of the disclosure, a method for determining the number of CQIs, the CQI calculation and the RI calculation is provided. The method includes the following steps. The base station configures at least one of the following pieces of information for the terminal through signaling. The information includes: determination of the number of CQIs reported, determination of the number of ranks, and calculation of the RI/the CQI.

Optionally, the method further includes the following steps. The base station independently configures the determination of the number of CQIs and/or the calculation of the CQI and/or the determination of the RI for multiple CSI processes.

Optionally, the method further includes the following steps. The base station and the terminal predefine the number of CQIs and/or the calculation of the CQI and/or the determination of the RI according to the types of CSI-RS or indexes of the CSI processes.

Optionally, the types of CSI-RS include: precoded CSI-RS and non-precoded CSI-RS.

Optionally, determining the number of CQIs reported or the number of ranks includes the following steps. The number of CQIs reported or the number of ranks is determined according to the number of CSI-RS ports. The number of CQIs reported or the number of ranks is determined according to the number of downlink DMRS ports.

Optionally, calculating the CQI includes the following steps. The CQI is calculated based on the assumption that the transmission diversity mode is adopted on the downlink. The CQI is calculated based on the assumption that the spatial multiplexing is adopted on the downlink.

Optionally, determining the RI calculation includes the follows. Each rank corresponds to a group of configuration parameters of the CSI-RS. The configuration parameters of the CSI-RS include: the indexes of CSI-RS ports and the number of CSI-RS ports.

According to another aspect of the disclosure, a device for determining the number of CQIs is provided. The device is at the terminal side and includes: a first performing module, which is configured to determine the number of ranks or the number of CQIs to be fed back according to at least one of the following pieces of information: the number of CSI-RS ports, the number of downlink DMRS ports, and the configuration signaling of the base station.

Optionally, the device further includes: a second performing module, which is configured to feed back the CSI based on the number of ranks, or calculate the CSI, or determine the number of CQIs to be fed back.

Optionally, the device further includes: a feedback module, which is configured to feed back the number of ranks to the base station.

Optionally, the device further includes: a first determining module, which is configured to determine performing the operation of determining the number of CQIs to be fed back based on the number of ranks according to the configuration of the base station or the pilot types of the current CSI-RS. The pilot types include: the precoding pilot and the non-precoding pilot.

Optionally, the second performing module includes: a first determining unit, which is configured to, when the number of ranks is k, determine the number of CQIs to be fed back as 1, and when the number of ranks is one of other values except k, determine the number of CQIs to be fed back as 2; k is an integer between 1 and ceil(N/2), including 1 and ceil(N/2), wherein N is the number of physical antennas at the base station side, and ceil( ) is the ceiling function; or, a second determining unit, which is configured to, when the number of ranks is k, determine the number of CQIs to be fed back as 1, when the number of ranks is an integer between k+1 and ceil(N*2/3), including k+1 and ceil(N*2/3), determine the number of CQIs to be fed back as 2, and when the number of ranks is an integer between ceil(N*2/3)+1 and ceil(N), including ceil(N*2/3)+1 and ceil(N), determine the number of CQIs to be fed back as 3; where k is an integer between 1 and ceil(N/2), including 1 and ceil(N/2), wherein N is the number of physical antennas at the base station side, and ceil( ) is the ceiling function.

Optionally, the device further includes: a third performing module, which is configured to perform the operation of determining the number of ranks or the number of CQIs to be fed back based on the information according to the agreement between the base station and the terminal or the configuration of the base station.

Optionally, the first performing module is further configured for the terminal to determine the number of ranks based on the agreed rule that the number of ports is equal to the number of ranks, according to the number of ports and/or the mapping relationship and/or the mode selected by the terminal.

Optionally, the first determining module is further configured to, when the type of CSI-RS is precoded CSI-RS, determine the number of ranks and/or the number of CQIs to be fed back according to the number of CSI-RS ports, and calculate the CQI based on the assumption that spatial multiplexing is adopted on the downlink. The first determining module is further configured to, when the type of CSI-RS is non-precoded CSI-RS, determine the number of ranks and/or the number of CQIs to be fed back as 1, and calculate the CQI based on the assumption that a transmission diversity mode is adopted on the downlink; or, calculates the CQI and the number of feedback ranks based on the CSI-RS.

Optionally, the first performing module is further configured to determine the number of ranks and/or the number of CQIs to be fed back according to the system duplex mode.

Optionally, the first performing module includes: a third determining unit, which is configured to, when the number of CSI-RS ports or the number of DMRS ports is k, determine the number of CQIs to be fed back as 1, and when the number of CSI-RS ports or the number of DMRS ports is one of other values except k, determine the number of CQIs to be fed back as 2; k is an integer between 1 and ceil(N/2), including 1 and ceil(N/2), wherein N is the number of physical antennas at the base station side, and ceil( ) is the ceiling function; or, a fourth determining unit, which is configured to, when the number of CSI-RS ports or the number of DMRS ports is k, determine the number of CQIs to be fed back as 1, when the number of CSI-RS ports or the number of DMRS ports is an integer between k+1 and ceil(N*2/3), including k+1 and ceil(N*2/3), determine the number of CQIs to be fed back as 2, and when the number of CSI-RS ports or the number of DMRS ports is an integer between ceil(N*2/3)+1 and ceil(N), including ceil(N*2/3)+1 and ceil(N), determine the number of CQIs to be fed back as 3; k is an integer between 1 and ceil(N/2), including 1 and ceil(N/2), wherein N is the number of physical antennas at the base station side, and ceil( ) is the ceiling function.

Optionally, the device further includes: a sending module, which is configured to send the SRS and/or the CQI to the base station, and determine the number of CQIs to be fed back by the terminal, according to the SRS and/or the CQI.

Optionally, the number of CSI-RS ports or the number of downlink DMRS ports indicates a maximum number of ranks which can be reported by the terminal.

Optionally, each rank corresponds to a group of configuration parameters of the CSI-RS; the configuration parameters of the CSI-RS include: the indexes of CSI-RS ports and the number of CSI-RS ports.

Optionally, the number of downlink DMRS ports is indicated by the 3-bit antenna port, the scrambling identifier and the number of ranks which are carried in the downlink control signaling.

According to another aspect of the disclosure, a device for determining the number of CQIs, the CQI calculation and the RI calculation is provided. The device is at the terminal side. The device includes: a second determining module, which is configured to determine the number of CQIs to be reported by the UE, and the RI/CQI calculation according to at least one of the following pieces of information: the number of CSI-RS ports, the configuration signaling of the base station, the system duplex mode, and the pilot types.

Optionally, the pilot types of CSI-RS include: the precoding pilot and the non-precoding pilot.

Optionally, the configuration signaling of the base station includes that: the base station independently configures determination of the number of CQIs and/or determination of the CQI calculation and/or determination of the RI calculation for multiple CSI processes.

Optionally, the system duplex mode include: a duplex mode of the FDD system and a duplex mode of the TDD system.

Optionally, determining the CQI calculation includes the following steps. The CQI is calculated based on the assumption that spatial multiplexing is adopted on the downlink. The CQI is calculated based on the assumption that transmission diversity is adopted on the downlink.

Optionally, determining the CQI calculation includes the following steps. When the type of CSI-RS is the precoded CSI-RS, the terminal determines the number of ranks and/or the number of CQIs to be reported by the UE according to the number of CSI-RS ports, and calculates the CQI based on the assumption that the spatial multiplexing is adopted on the downlink. When the type of CSI-RS is the non-precoded CSI-RS, the terminal calculates the CQI based on the assumption that the transmission diversity mode is adopted on the downlink.

Optionally, determining the CQI calculation includes the following steps. When the system that the terminal accesses is the TDD system and the type of CSI-RS is the precoded CSI-RS, the terminal determines the number of ranks and/or the number of CQIs to be reported by the UE according to the number of CSI-RS ports, and calculates the CQI based on the assumption that the spatial multiplexing is adopted on the downlink.

Optionally, determining the RI calculation includes the following steps. The terminal configures that each rank corresponds to a group of configuration parameters of the CSI-RS. The configuration parameters of the CSI-RS include: the indexes of CSI-RS ports and the number of CSI-RS ports.

According to another aspect of the disclosure, a device for determining the number of CQIs, the CQI calculation and the RI calculation is provided. The device is at the base station side. The device includes: a first configuring module, which is configured to configure at least one of the following pieces of information for the terminal through signaling. The information includes: determination of the number of CQIs reported, determination of the number of ranks, and calculation of the RI/the CQI.

Optionally, the device further includes: a second configuring module, which is configured to independently configure the determination of the number of CQIs and/or the calculation of the CQI and/or the determination of the RI for multiple CSI processes.

Optionally, the device further includes: a predefining module, which is configured to predefine the number of CQIs and/or the calculation of the CQI and/or the determination of the RI according to the types of CSI-RS or the indexes of the CSI processes.

Optionally, the types of CSI-RS include: the precoded CSI-RS and the non-precoded CSI-RS.

Optionally, determining the number of CQIs reported or the number of ranks includes the following steps. The number of CQIs reported or the number of ranks is determined according to the number of CSI-RS ports; and the number of CQIs reported or the number of ranks is determined according to the number of downlink DMRS ports.

Optionally, calculating the CQI includes the following steps. The CQI is calculated based on the assumption that the transmission diversity mode is adopted on the downlink. The CQI is calculated based on the assumption that the spatial multiplexing is adopted on the downlink.

Optionally, determining the RI calculation includes the follows. Each rank corresponds to a group of configuration parameters of the CSI-RS. The configuration parameters of the CSI-RS include: the indexes of CSI-RS ports and the number of CSI-RS ports.

According to the present disclosure, the terminal determines the number of ranks or the number of CQIs to be fed back according to at least one of the number of CSI-RS ports, the number of downlink DMRS ports, and the configuration signaling of the base station. Therefore, the problem of non-matching between the CQIs reported by the TDD system in case of the FD-MIMO and the CQIs actually needed in the related art is solved, improving the reliability of downlink transmission, saving overhead of downlink signaling, and improving the downlink transmission performance.

BRIEF DESCRIPTION OF DRAWINGS

The accompanying drawings described here are used for providing a deeper understanding of the disclosure, and constitute a part of the application; schematic embodiments of the disclosure and description thereof are used for illustrating the disclosure and not intended to form an improper limit to the disclosure. In the accompanying drawings.

DETAILED DESCRIPTION

Note that, the embodiments of the application and the characteristics in the embodiments can be combined under the condition of no conflicts. The disclosure is elaborated below with reference to the accompanying drawings and embodiments.

Figure 1:
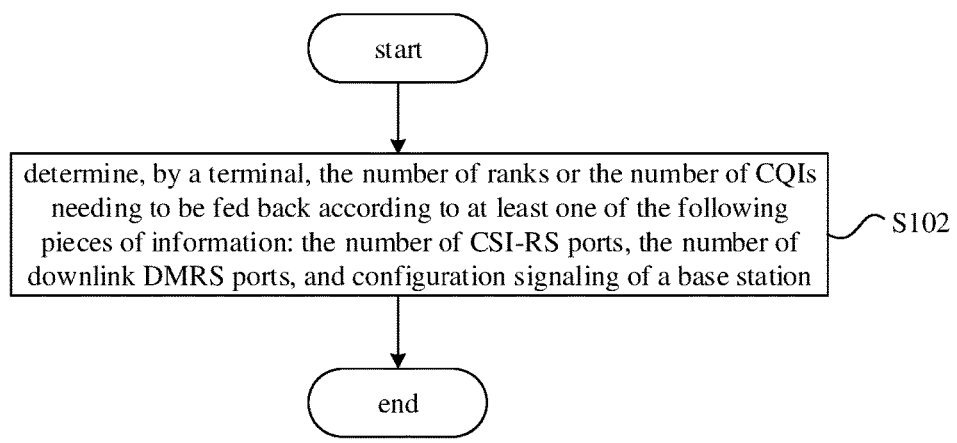
FIG. 1 is a flowchart of a method for determining the number of CQIs according to an embodiment of the disclosure.

An embodiment of the disclosure provides a method for determining the number of CQIs. FIG. 1 is a flowchart of the method for determining the number of CQIs according to an embodiment of the disclosure; as shown in FIG. 1, the method includes the following steps.

In a step S102, a terminal determines the number of ranks or the number of CQIs to be fed back according to at least one of the following pieces of information: the number of CSI-RS ports, the number of downlink DMRS ports, and configuration signaling of a base station.

According to the embodiment of the disclosure, the terminal determines the number of ranks or the number of CQIs to be fed back according to at least one of the number of CSI-RS ports, the number of downlink DMRS ports, and the configuration signaling of the base station. In this way, the problem of non-matching between the CQIs reported by the TDD system under the FD-MIMO technology and the CQIs actually needed in the related art is solved, the reliability of downlink transmission is improved, overhead of downlink signaling is saved, and the downlink transmission performance is improved.

Optionally, in another embodiment of the disclosure, after determining the number of ranks, the terminal can also feed back the CSI or calculate the CSI or determine the number of CQIs to be fed back based on the number of ranks.

After determining the number of CQIs to be fed back, the terminal can feed back the number of ranks to the base station.

Optionally, performing the operation of determining the number of CQIs to be fed back based on the number of ranks involved in the present embodiment is determined by the terminal according to the configuration of the base station or the pilot types of the current CSI-RS. The pilot types include: the precoding pilot and the non-precoding pilot.

In the embodiment, the terminal determines the number of CQIs based on the number of ranks in the following ways.

Way 1: when the number of ranks is k, the terminal determines the number of CQIs to be fed back as 1. When the number of ranks is one of other values except k, the terminal determines the number of CQIs to be fed back as 2. Where k is an integer between 1 and ceil(N/2), including 1 and ceil(N/2), N is the number of physical antennas at the base station side, and ceil( ) is the ceiling function.

Way 2: when the number of ranks is k, the terminal determines the number of CQIs to be fed back as 1. When the number of ranks is an integer between k+1 and ceil(N*2/3), including k+1 and ceil(N*2/3), the terminal determines the number of CQIs to be fed back as 2. When the number of ranks is an integer between ceil(N*2/3)+1 and ceil(N), including ceil(N*2/3)+1 and ceil(N), the terminal determines the number of CQIs to be fed back as 3. Where k is an integer between 1 and ceil(N/2), including 1 and ceil(N/2), N is the number of physical antennas at the base station side, and ceil( ) is the ceiling function.

Moreover, performing the operation of determining the number of ranks or the number of CQIs to be fed back based on the information is determined by the terminal according to the agreement between the base station and the terminal or the configuration of the base station.

In the embodiment, the terminal can determine the number of ranks in the following way. The terminal determines the number of ranks based on the agreed rule that the number of ports is equal to the number of ranks, according to the number of ports and/or the mapping relationship and/or the mode selected by the terminal.

Based on the pilot types, the terminal can determine the number of ranks and/or the number of CQIs to be fed back according to the pilot types of CSI-RS in the following steps.

In a step S11, when the type of CSI-RS is the precoded CSI-RS, the terminal determines the number of ranks and/or the number of CQIs to be fed back according to the number of CSI-RS ports, and calculates the CQI based on the assumption that spatial multiplexing is adopted on the downlink.

In a step S12, when the type of CSI-RS is the non-precoded CSI-RS, the terminal determines the number of ranks and/or the number of CQIs to be fed back as 1, and calculates the CQI based on the assumption that the transmission diversity mode is adopted on the downlink, or, the terminal calculates the CQI and the number of feedback ranks based on the CSI-RS.

In another embodiment of the disclosure, the terminal can also determine the number of ranks and/or the number of CQIs to be fed back according to a system duplex mode.

The terminal can determine the number CQIs to be fed back according to the number of CSI-RS ports or the number of DMRS ports in the following ways.

Way 1: when the number of CSI-RS ports or the number of DMRS ports is k, the terminal determines the number of CQIs to be fed back as 1. When the number of CSI-RS ports or the number of DMRS ports is one of other values except k, the terminal determines the number of CQIs to be fed back as 2. Where k is an integer between 1 and ceil(N/2), including 1 and ceil(N/2), N is the number of physical antennas at the base station side, and ceil( ) is the ceiling function;

Way 2: when the number of CSI-RS ports or the number of DMRS ports is k, the terminal determines the number of CQIs to be fed back as 1. When the number of CSI-RS ports or the number of DMRS ports is an integer between k+1 and ceil(N*2/3), including k+1 and ceil(N*2/3), the terminal determines the number of CQIs to be fed back as 2. When the number of CSI-RS ports or the number of DMRS ports is an integer between ceil(N*2/3)+1 and ceil(N), including ceil(N*2/3)+1 and ceil(N), the terminal determines the number of CQIs to be fed back as 3. Where k is an integer between 1 and ceil(N/2), including 1 and ceil(N/2), N is the number of physical antennas at the base station side, and ceil( ) is the ceiling function.

Moreover, the terminal can send the SRS and/or the CQI to the base station, and then the base station determines the number of CQIs to be fed back, according to the SRS and/or the CQI.

Note that, the number of CSI-RS ports or the number of downlink DMRS ports indicates a maximum number of ranks which can be reported by the terminal Each rank corresponds to a group of configuration parameters of the CSI-RS; the configuration parameters of the CSI-RS include: the indexes of CSI-RS ports and the number of CSI-RS ports. The number of downlink DMRS ports is indicated by the 3-bit antenna port, the scrambling identifier and the number of ranks which are carried in the downlink control signaling.

Figure 2:
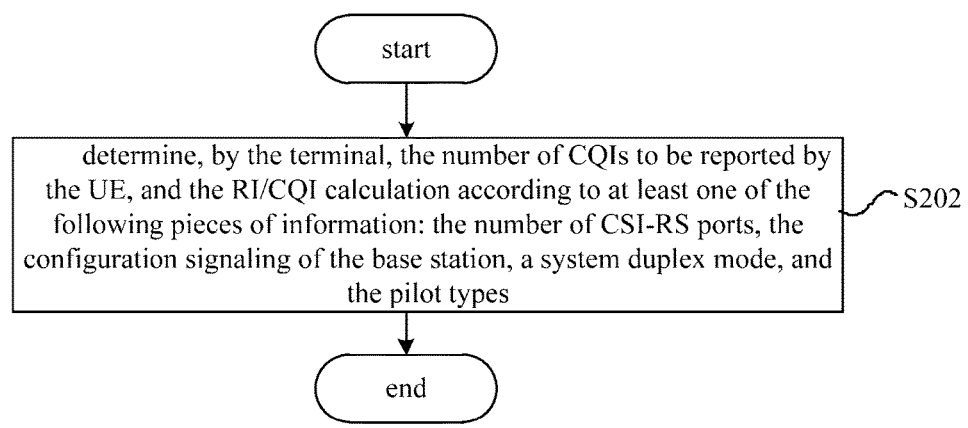
FIG. 2 is a flowchart of a method for determining the number of CQIs, a CQI calculation and an RI calculation according to an embodiment of the disclosure.

FIG. 2 is a flowchart of a method for determining the number of CQIs, a CQI calculation and an RI calculation according to an embodiment of the disclosure. As shown in FIG. 2, the method includes the following steps.

In a step S202, the terminal determines the number of CQIs to be reported by the UE, and the RI/CQI calculation according to at least one of the following pieces of information: the number of CSI-RS ports, the configuration signaling of the base station, the system duplex mode, and the pilot types.

Note that, the pilot types of CSI-RS involved in the embodiment include: the precoding pilot and the non-precoding pilot.

Optionally, the configuration signaling of the base station includes the following step. The base station independently configures the determination of the number of CQIs and/or the determination of the CQI calculation and/or the determination of the RI calculation for multiple CSI processes. The system duplex mode includes the duplex mode of the FDD system and the duplex mode of the TDD system. Determining the CQI calculation includes the following steps. The CQI is calculated based on the assumption that spatial multiplexing is adopted on the downlink. The CQI is calculated based on the assumption that transmission diversity is adopted on the downlink.

Moreover, determining the CQI calculation in the embodiment may include the following steps. When the type of CSI-RS is the precoded CSI-RS, the terminal determines the number of ranks and/or the number of CQIs to be reported by the UE according to the number of CSI-RS ports, and calculates the CQI based on the assumption that the spatial multiplexing is adopted on the downlink. When the type of CSI-RS is the non-precoded CSI-RS, the terminal calculates the CQI based on the assumption that the transmission diversity mode is adopted on the downlink.

Determining the CQI calculation in the embodiment includes the following steps. When the system that the terminal accesses is the TDD system and the type of CSI-RS is the precoded CSI-RS, the terminal determines the number of ranks and/or the number of CQIs to be reported by the UE according to the number of CSI-RS ports, and calculates the CQI based on the assumption that the spatial multiplexing is adopted on the downlink.

Determining the RI calculation in the embodiment may also include the following steps. The terminal configures that each rank corresponds to a group of configuration parameters of the CSI-RS. The configuration parameters of the CSI-RS include: the indexes of CSI-RS ports and the number of CSI-RS ports.

Figure 3:
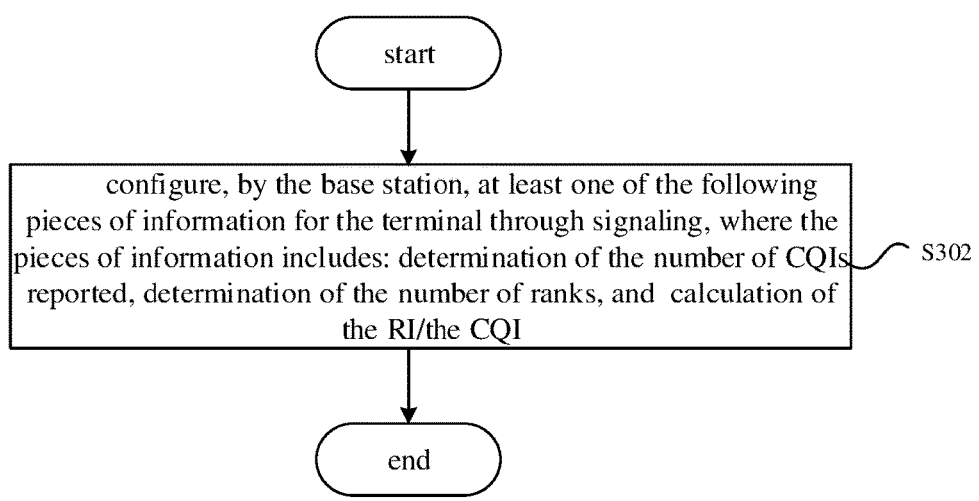
FIG. 3 is a flowchart of a method for determining the number of CQIs, a CQI calculation and an RI calculation according to an embodiment of the disclosure.

FIG. 3 is a flowchart of a method for determining the number of CQIs, a CQI calculation and an RI calculation according to an embodiment of the disclosure. As shown in FIG. 3, the method includes the following steps.

In a step S302, the base station configures at least one of the following pieces of information for the terminal through signaling. The information includes determination of the number of CQIs reported, determination of the number of ranks, and calculation of the RI/the CQI.

Optionally, the method of the embodiment may also include the following steps. The base station independently configures the determination of the number of CQIs and/or the calculation of the CQI and/or the determination of the RI for multiple CSI processes.

Moreover, the base station and the terminal predefine the number of CQIs and/or the calculation of the CQI and/or the determination of the RI according to the types of CSI-RS or the indexes of the CSI processes.

The types of CSI-RS in the embodiment include the precoded CSI-RS and the non-precoded CSI-RS.

Optionally, determining the number of CQIs reported or the number of ranks includes the following steps. The number of CQIs reported or the number of ranks is determined according to the number of CSI-RS ports. The number of CQIs reported or the number of ranks is determined according to the number of downlink DMRS ports. The CQI is calculated based on the assumption that the transmission diversity mode is adopted on the downlink, and the CQI is calculated based on the assumption that the spatial multiplexing is adopted on the downlink. Each rank corresponds to a group of configuration parameters of the CSI-RS. The configuration parameters of the CSI-RS include: the indexes of CSI-RS ports and the number of CSI-RS ports.

Figure 4:
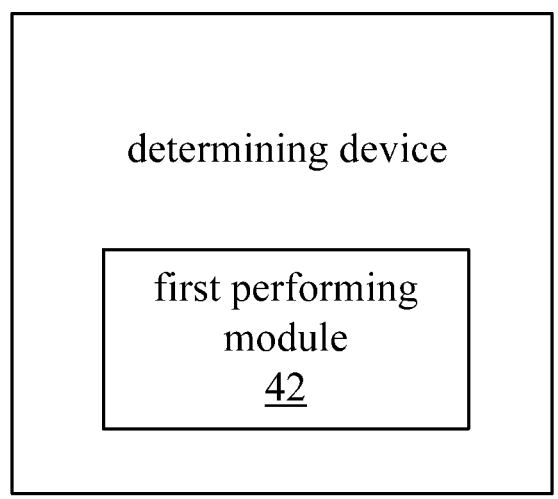
FIG. 4 is a structure diagram of a device for determining the number of CQIs according to an embodiment of the disclosure.

FIG. 4 is a structure diagram of a device for determining the number of CQIs according to an embodiment of the disclosure. The device is at the terminal side. As shown in FIG. 4, the device includes: a first performing module 42, which is configured to determine the number of ranks or the number of CQIs to be fed back according to at least one of the following pieces of information: the number of CSI-RS ports, the number of downlink DMRS ports, and the configuration signaling of the base station.

Optionally, the device further includes: a second performing module, which is configured to feed back the CSI based on the number of ranks, or calculate the CSI, or determine the number of CQIs to be fed back.

Optionally, the device further includes: a feedback module, which is configured to feed back the number of ranks to the base station.

Optionally, the device further includes: a first determining module, which is configured to determine performing the operation of determining the number of CQIs to be fed back based on the number of ranks according to the configuration of the base station or the pilot types of the current CSI-RS. The pilot types include the precoding pilot and the non-precoding pilot.

Optionally, the second performing module includes a first determining unit, which is configured to perform the following operations. When the number of ranks is k, the number of CQIs to be fed back is determined as 1. When the number of ranks is one of other values except k, the number of CQIs to be fed back is determined as 2. Where k is an integer between 1 and ceil(N/2), including 1 and ceil(N/2), N is the number of physical antennas at the base station side, and ceil( ) is the ceiling function. Alternatively, the second performing module includes a second determining unit, which is configured to perform the following operations. When the number of ranks is k, the number of CQIs to be fed back is determined as 1. When the number of ranks is an integer between k+1 and ceil(N*2/3), including k+1 and ceil(N*2/3), the number of CQIs to be fed back is determined as 2. When the number of ranks is an integer between ceil(N*2/3)+1 and ceil(N), including ceil(N*2/3)+1 and ceil(N), the number of CQIs to be fed back is determined as 3. Where k is an integer between 1 and ceil(N/2), including 1 and ceil(N/2), N is the number of physical antennas at the base station side, and ceil( ) is the ceiling function.

Optionally, the device further includes: a third performing module, which is configured to perform the operation of determining the number of ranks or the number of CQIs to be fed back based on the information according to the agreement between the base station and the terminal or the configuration of the base station. Optionally, the first performing module is further configured for the terminal to determine the number of ranks based on the agreed rule that the number of ports is equal to the number of ranks, according to the number of ports and/or the mapping relationship and/or the mode selected by the terminal.

Optionally, the first determining module is further configured to perform the following operations. When the type of CSI-RS is precoded CSI-RS, the number of ranks and/or the number of CQIs to be fed back is determined according to the number of CSI-RS ports. The CQI is calculated based on the assumption that spatial multiplexing is adopted on the downlink. The first determining module is further configured to perform the following operations. When the type of CSI-RS is non-precoded CSI-RS, the number of ranks and/or the number of CQIs to be fed back is determined as 1. The CQI is calculated based on the assumption that a transmission diversity mode is adopted on the downlink. Alternatively, the CQI and the number of feedback ranks are calculated based on the CSI-RS.

Optionally, the first performing module is further configured to determine the number of ranks and/or the number of CQIs to be fed back according to the system duplex mode.

Optionally, the first performing module includes: a third determining unit, which is configured to perform the following steps. When the number of CSI-RS ports or the number of DMRS ports is k, the number of CQIs to be fed back is determined as 1. When the number of CSI-RS ports or the number of DMRS ports is one of other values except k, the number of CQIs to be fed back is determined as 2. Where k is an integer between 1 and ceil(N/2), including 1 and ceil(N/2), N is the number of physical antennas at the base station side, and ceil( ) is the ceiling function. Alternatively, the first performing module includes a fourth determining unit, which is configured to perform the following operations. When the number of CSI-RS ports or the number of DMRS ports is k, the number of CQIs to be fed back is determined as 1. When the number of CSI-RS ports or the number of DMRS ports is an integer between k+1 and ceil(N*2/3), including k+1 and ceil(N*2/3), the number of CQIs to be fed back is determined as 2. When the number of CSI-RS ports or the number of DMRS ports is an integer between ceil(N*2/3)+1 and ceil(N), including ceil(N*2/3)+1 and ceil(N), the number of CQIs to be fed back is determined as 3. Where k is an integer between 1 and ceil(N/2), including 1 and ceil(N/2), N is the number of physical antennas at the base station side, and ceil( ) is the ceiling function.

Optionally, the device further includes: a sending module, which is configured to send the SRS and/or the CQI to the base station, and determine the number of CQIs to be fed back by the terminal, according to the SRS and/or CQI.

Optionally, the number of CSI-RS ports or the number of downlink DMRS ports indicates a maximum number of ranks which can be reported by the terminal.

Optionally, each rank corresponds to a group of configuration parameters of the CSI-RS. The configuration parameters of the CSI-RS include: the indexes of CSI-RS ports and the number of CSI-RS ports.

Optionally, the number of downlink DMRS ports is indicated by the 3-bit antenna port, the scrambling identifier and the number of ranks which are carried in the downlink control signaling.

Figure 5:
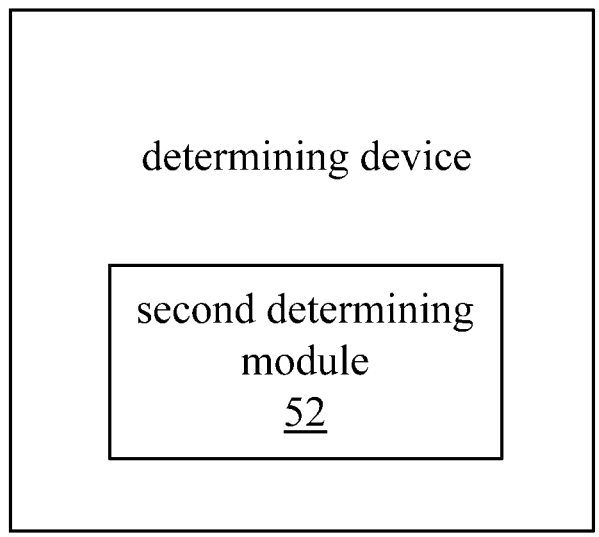
FIG. 5 is a structure diagram of a device for determining the number of CQIs, a CQI calculation and an RI calculation according to an embodiment of the disclosure.

FIG. 5 is a structure diagram of a device for determining the number of CQIs, a CQI calculation and an RI calculation according to an embodiment of the disclosure. The device is at the terminal side. As shown in FIG. 5, the device includes: a second determining module 52, which is configured to determine the number of CQIs to be reported by the UE, and the RI/CQI calculation according to at least one of the following pieces of information: the number of CSI-RS ports, the configuration signaling of the base station, the system duplex mode, and the pilot types.

Note that, the pilot types of CSI-RS involved in the embodiment may include the precoding pilot and the non-precoding pilot.

Optionally, the configuration signaling of the base station involved in the embodiment includes that: the base station independently configures the determination of the number of CQIs and/or the determination of the CQI calculation and/or the determination of RI calculation for multiple CSI processes. The system duplex mode include: the duplex mode of the FDD system and the duplex mode of the TDD system. Determining the CQI calculation includes the following steps. The CQI is calculated based on the assumption that spatial multiplexing is adopted on the downlink. The CQI is calculated based on the assumption that transmission diversity is adopted on the downlink.

Determining the CQI calculation includes the following steps. When the type of CSI-RS is the precoded CSI-RS, the terminal determines the number of ranks and/or the number of CQIs to be reported by the UE according to the number of CSI-RS ports, and calculates the CQI based on the assumption that the spatial multiplexing is adopted on the downlink. When the type of CSI-RS is the non-precoded CSI-RS, the terminal calculates the CQI based on the assumption that the transmission diversity mode is adopted on the downlink. Determining the CQI calculation in the embodiment includes the following steps. When the system that the terminal accesses is the TDD system and the type of CSI-RS is the precoded CSI-RS, the terminal determines the number of ranks and/or the number of CQIs to be reported by the UE according to the number of CSI-RS ports, and calculates the CQI based on the assumption that the spatial multiplexing is adopted on the downlink. Determining the RI calculation in the embodiment may also include the following steps. The terminal configures that each rank corresponds to a group of configuration parameters of the CSI-RS. The configuration parameters of the CSI-RS include the indexes of CSI-RS ports and the number of CSI-RS ports.

Figure 6:
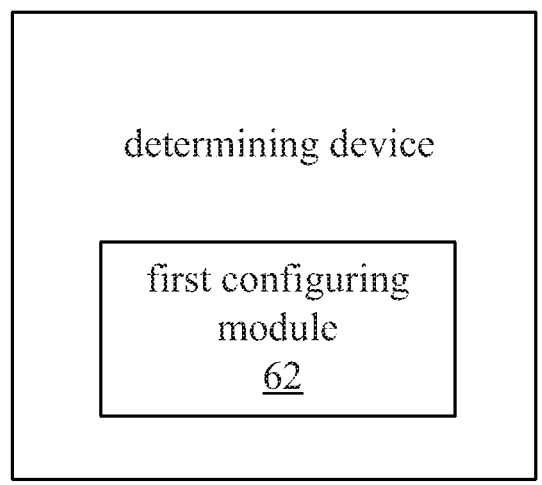
FIG. 6 is a structure diagram of a device for determining the number of CQIs, a CQI calculation and an RI calculation according to an embodiment of the disclosure.

FIG. 6 is a structure diagram of a device for determining the number of CQIs, a CQI calculation and an RI calculation according to an embodiment of the disclosure. The device is at the base station side. As shown in FIG. 6, the device includes: a first configuring module 62, which is configured to configure at least one of the following pieces of information for the terminal through signaling. The information includes: determination of the number of CQIs reported, determination of the number of ranks, and calculation of the RI/the CQI.

Optionally, the device further includes: a second configuring module, which is configured to independently configure the determination of the number of CQIs and/or the calculation of the CQI and/or the determination of the RI for multiple CSI processes.

Optionally, the device further includes: a predefining module, which is configured to predefine the number of CQIs and/or the calculation of the CQI and/or the determination of the RI according to the types of CSI-RS or the indexes of the CSI processes.

Note that, the pilot types of CSI-RS involved in the embodiment include: the precoding pilot and the non-precoding pilot.

Optionally, determining the number of CQIs reported or the number of ranks includes the following steps. The number of CQIs reported or the number of ranks is determined according to the number of CSI-RS ports. The number of CQIs reported or the number of ranks is determined according to the number of downlink DMRS ports. Calculating the CQI includes the following steps. The CQI is calculated based on the assumption that the transmission diversity mode is adopted on the downlink; and the CQI is calculated based on the assumption that the spatial multiplexing is adopted on the downlink. Determining the RI calculation includes the following steps. Each rank corresponds to a group of configuration parameters of the CSI-RS. The configuration parameters of the CSI-RS include: the indexes of CSI-RS ports and the number of CSI-RS ports.

The disclosure is illustrated through embodiments of the disclosure below.

First Embodiment

In the present embodiment, the base station side determines the number of CQIs to be reported by the UE, and indicates the number to the UE in the following way.

The number of CQIs to be reported by the UE is indicated by configuring the number of CSI-RS ports.

The base station determines the number of CQIs to be reported by the UE according to the received SRS and/or the CQI reported by the UE.

When the number of CQIs is 1, the reported CQI corresponds to the first codeword stream. When the number of CQIs is 2, the reported CQIs correspond to the first codeword stream and the second codeword stream. The reported CQI can be either broadband CQI or sub-band CQI.

Indicating the number of CQIs to be reported by the UE by configuring the number of CSI-RS ports includes several ways as follows.

(1) When the number of CSI-RS ports configured for the UE by the base station is 1, the number of CQIs to be reported by the UE is 1. When the number of CSI-RS ports configured for the UE by the base station is 2, 3, or 4, the number of CQIs to be reported by the UE is 2.

(2) When the number of CSI-RS ports configured for the UE by the base station is 1 or 2, the number of CQIs to be reported by the UE is 1. When the number of CSI-RS ports configured for the UE by the base station is 3 or 4, the number of CQIs to be reported by the UE is 2.

(3) When the number of CSI-RS ports configured for the UE by the base station is 1, the number of CQIs to be reported by the UE is 1. When the number of CSI-RS ports configured for the UE by the base station is any integer between 2 and 8 (including 2 and 8), the number of CQIs to be reported by the UE is 2.

(4) When the number of CSI-RS ports configured for the UE by the base station is any integer between 1 and 4 (including 1 and 4), the number of CQIs to be reported by the UE is 1. When the number of CSI-RS ports configured for the UE by the base station is any integer between 5 and 8 (including 5 and 8), the number of CQIs to be reported by the UE is 2.

The CSI-RS is the precoded CSI-RS, and its precoding matrix is based on uplink CSI obtained by measuring the SRS.

The UE receives the configuration of the CSI-RS port issued by the base station side, and determines the number of CQIs to be reported and reports the CQIs to the base station according to a relationship between the predefined number of CSI-RS ports and the number of CQIs to be reported.

Second Embodiment

In the present embodiment, the base station side determines the number of CQIs to be reported by the UE, and indicates the number to the UE in the following way.

The number of CQIs to be reported by the UE is indicated by configuring the number of downlink DMRS ports.

The base station determines the number of CQIs to be reported by the UE according to the received SRS and/or the CQI reported by the UE.

When the number of CQIs is 1, the reported CQI corresponds to the first codeword stream. When the number of CQIs is 2, the reported CQIs correspond to the first codeword stream and the second codeword stream. The reported CQI can be either broadband CQI or sub-band CQI.

Indicating the number of CQIs to be reported by the UE by configuring the number of downlink DMRS ports includes several ways as follows.

(1) When the number of downlink DMRS ports configured for the UE by the base station is 1, the number of CQIs to be reported by the UE is 1. When the number of downlink DMRS ports configured for the UE by the base station is 2, 3, or 4, the number of CQIs to be reported by the UE is 2.

(2) When the number of downlink DMRS ports configured for the UE by the base station is 1 or 2, the number of CQIs to be reported by the UE is 1. When the number of downlink DMRS ports configured for the UE by the base station is 3 or 4, the number of CQIs to be reported by the UE is 2.

(3) When the number of downlink DMRS ports configured for the UE by the base station is 1, the number of CQIs to be reported by the UE is 1. When the number of downlink DMRS ports configured for the UE by the base station is any integer between 2 and 8 (including 2 and 8), the number of CQIs to be reported by the UE is 2.

(4) When the number of downlink DMRS ports configured for the UE by the base station is any integer between 1 and 4 (including 1 and 4), the number of CQIs to be reported by the UE is 1. When the number of downlink DMRS ports configured for the UE by the base station is any integer between 5 and 8 (including 5 and 8), the number of CQIs to be reported by the UE is 2.

The UE receives the configuration of the downlink DMRS port issued by the base station side, and determines the number of CQIs to be reported and reports the CQIs to the base station according to a relationship between the predefined number of downlink DMRS ports and the number of CQIs to be reported.

The number of downlink DMRS ports is indicated by the 3-bit antenna port, the scrambling identifier and the number of ranks which are carried in the downlink control signaling.

Third Embodiment

In the present embodiment, the base station side determines the number of CQIs to be reported by the UE, and indicates the number to the UE in the following way.

The number of CQIs to be reported by the UE is indicated through information in the downlink control signaling.

The information for indicating the number of CQIs to be reported by the UE may be 1 bit, indicating whether the number of CQIs to be reported by the UE is 1 or 2. For example, when the value of the indication information in the downlink control signaling is 0, the number of CQIs to be reported by the UE is 1. When the value of the indication information in the downlink control signaling is 1, the number of CQIs to be reported by the UE is 2.

The base station determines the number of CQIs to be reported by the UE according to the received SRS and/or the CQI reported by the UE.

The UE receives the downlink control signaling issued by the base station side, and determines the number of CQIs to be reported and reports the CQIs to the base station.

Fourth Embodiment

In the present embodiment, the base station side predefines the determination of the RI, and indicates the mode to the UE in the following way.

A maximum number of ranks which can be reported by the UE is indicated through the number of CSI-RS ports or downlink DMRS ports.

Each RI corresponds to a group of configuration parameters of the CSI-RS. The configuration parameters of the CSI-RS include: the indexes of CSI-RS ports and the number of CSI-RS ports.

For example, when the configured CSI-RS port is the port 15, the maximum number of ranks which can be reported by the UE is 1. When the configured CSI-RS port is the port 15 and the port 16, the maximum number of ranks which can be reported by the UE is 2. When the configured CSI-RS port is the port 15, the port 16 and the port 17, the maximum number of ranks which can be reported by the UE is 3. When the number of ranks is 1, calculation is performed based on the port 15. When the number of ranks is 2, calculation is performed based on the port 15 and the port 16. Alternatively, when the number of ranks is 2, calculation is performed based on the port 16 and the ort 17. When the number of ranks is 3, calculation is performed based on the port 15, the port 16 and the port 17, and so on.

Fifth Embodiment

The base station independently configures the determination of the number of CQIs and/or the calculation of the CQI and/or the determination of the RI for multiple CSI processes.

The base station and the terminal predefine the number of CQIs and/or the calculation of the CQI and/or the determination of the RI according to the types of CSI-RS.

The types of CSI-RS include: the precoded CSI-RS and the non-precoded CSI-RS.

Calculating the CQI includes the following steps. The CQI is calculated based on the assumption that the transmission diversity mode is adopted on the downlink; and the CQI is calculated based on the assumption that the spatial multiplexing is adopted on the downlink.

For example, if the type of CSI-RS is the precoded CSI-RS, the number of CQIs to be reported by the UE is determined according to the number of CSI-RS ports, and the CQI is calculated based on the assumption that the spatial multiplexing is adopted on the downlink. If the type of CSI-RS is the non-precoded CSI-RS, the CQI is calculated based on the assumption that the transmission diversity mode is adopted on the downlink.

The base station and the terminal predefine the number of CQIs and/or the calculation of the CQI and/or the determination of the RI according to the indexes of the CSI processes.

For example, on the first CSI process, the CQI is calculated based on the assumption that the transmission diversity mode is adopted on the downlink.

On other CSI processes, the CQI is calculated based on the assumption that the spatial multiplexing is adopted on the downlink.

Each rank corresponds to a group of configuration parameters of the CSI-RS. The configuration parameters of the CSI-RS include: the indexes of CSI-RS ports and the number of CSI-RS ports.

The terminal determines the determination of the number of CQIs and/or the calculation of the CQI and/or the determination of the RI of the CSI process at least according to the type of CSI-RS corresponding to the CSI process or the index of the CSI process.

Sixth Embodiment

The base station configures for the terminal the CSI-RS port and/or the downlink DMRS port; the base station and the terminal agree the rule that the number of ports is equal to the number of ranks. The terminal determines the number of ranks according to the number of CSI-RS ports and/or the downlink DMRS ports, and then the terminal feeds back the CSI or calculates the CSI or determines the number of CQIs to be fed back according to the number of ranks. Determining the number of CQIs according to the number of ranks includes the following steps.

When the number of ranks is k, the number of CQIs to be fed back by the terminal is determined as 1. When the number of ranks is one of other values except k, the number of CQIs to be fed back by the terminal is determined as 2. Where k is an integer between 1 and ceil(N/2), including 1 and ceil(N/2), N is the number of physical antennas at the base station side, and ceil( ) is a ceiling function.

Alternatively, when the number of ranks is k, t the number of CQIs to be fed back by the terminal is determined as 1. When the number of ranks is an integer between k+1 and ceil(N*2/3), including k+1 and ceil(N*2/3), the number of CQIs to be fed back by the terminal is determined as 2. When the number of ranks is an integer between ceil(N*2/3)+1 and ceil(N), including ceil(N*2/3)+1 and ceil(N), the number of CQIs to be fed back by the terminal is determined as 3. Where k is an integer between 1 and ceil(N/2), including 1 and ceil(N/2), N is the number of physical antennas at the base station side, and ceil( ) is the ceiling function.

In another embodiment, a piece of software is also provided, which is used for performing the above embodiments and the technical solutions described in the optional implementation modes.

In another embodiment, a storage medium is also provided, in which the software is stored; the storage medium includes, but is not limited to: a compact disc, a floppy disk, a hard disk, an erasable memory, and so on.

Obviously, those skilled in the art should appreciate that the above modules and steps of the disclosure can be implemented by a general-purpose computing device, and they can be centralized in a single computing device or distributed on a network composed of multiple computing devices; optionally, they can be implemented by a program code which is capable of being executed by the computing device, so that they can be stored in a storage device and executed by the computing device; and in some situations, the presented or described steps can be executed in an order different from that described here; or they are made into integrated circuit modules, respectively; or multiple modules and steps of them are made into a single integrated circuit module to realize. In this way, the disclosure is not limited to any particular combination of hardware and software.

The above is only the preferred embodiment of the disclosure and not intended to limit the disclosure; for those skilled in the art, the disclosure may have various modifications and changes. Any modifications, equivalent replacements, improvements and the like within the spirit and principle of the disclosure shall fall within the scope of the claims of the disclosure.

INDUSTRIAL APPLICABILITY

According to the embodiments of the disclosure, a terminal determines the number of ranks or the number of CQIs to be fed back according to at least one of the number of CSI-RS ports, the number of downlink DMRS ports, and the configuration signaling of the base station. Therefore, the problem of non-matching between the CQIs reported by the TDD system in case of the FD-MIMO and the CQIs actually needed in the related art is solved, improving the reliability of downlink transmission, saving overhead of downlink signaling, and improving the downlink transmission performance.

The invention claimed is:

1. A method for determining a number of Channel Quality Indicators (CQI) comprising:
    determining, by a terminal, a number of ranks according to at least one piece of information, or determining, by the terminal, a number of CQIs to be fed back according to the at least one piece of information or the number of ranks; wherein the at least one piece of information comprises: a number of Channel State Information Reference Signal (CSI-RS) ports, a number of downlink Demodulation Reference Signal (DMRS) ports, and configuration signaling of a base station;
    wherein the method further comprises: determining, by the terminal, performing the operation of determining the number of CQIs to be fed back based on the number of ranks, according to a configuration of the base station or pilot types of CSI-RS; wherein the pilot types comprise: a precoding pilot and a non-precoding pilot;
    wherein determining, by the terminal, performing the operation of determining the number of CQIs to be fed back based on the number of ranks according to the pilot types of CSI-RS comprises:
        when the type of CSI-RS is precoded CSI-RS, determining, by the terminal, at least one of the number of ranks or the number of the CQIs to be fed back according to the number of CSI-RS ports, and calculating the CQI based on an assumption that spatial multiplexing is adopted on a downlink; and
        when the type of CSI-RS is non-precoded CSI-RS, determining, by the terminal, at least one of the number of ranks or the number of the CQIs to be fed back as 1, and calculating the CQI based on an assumption that a transmission diversity mode is adopted on the downlink; or, calculating, by the terminal, the CQI and the number of ranks based on the CSI-RS.

2. The method according to claim 1, further comprising: based on the number of ranks, feeding back, by the terminal, Channel State Information (CSI), or calculating the CSI.

3. The method according to claim 2, wherein determining, by the terminal, the number of CQIs based on the number of ranks comprises:
    when the number of ranks is k, determining, by the terminal, the number of CQIs to be fed back as 1; when the number of ranks is one of other values except k, determining the number of CQIs to be fed back as 2; k being an integer between 1 and ceil(N/2), including 1 and ceil(N/2), wherein N is a number of physical antennas or a number of antenna ports at the base station side, and ceil( ) is a ceiling function; or,
    when the number of ranks is k, determining, by the terminal, the number of CQIs to be fed back as 1; when the number of ranks is an integer between k+1 and ceil(N*2/3), including k+1 and ceil(N*2/3), determining the number of CQIs to be fed back as 2; when the number of ranks is an integer between ceil(N*2/3)+1 and ceil(N), including ceil(N*2/3)+1 and ceil(N), determining the number of CQIs to be fed back as 3; k being an integer between 1 and ceil(N/2), including 1 and ceil(N/2), wherein N is a number of physical antennas or a number of antenna ports at the base station side, and ceil( ) is a ceiling function.

4. The method according to claim 1, further comprising: performing, by the terminal, the operation of determining the number of ranks or the number of CQIs to be fed back based on the at least one piece of information, according to an agreement between the base station and the terminal or the configuration of the base station.

5. The method according to claim 4, wherein determining, by the terminal, the number of ranks comprises:
    determining, by the terminal, the number of ranks based on an agreed rule that a number of ports is equal to the number of ranks, according to at least one of the number of ports, a mapping relationship or a mode selected by the terminal.

6. The method according to claim 1, wherein determining, by the terminal, the number of CQIs to be fed back according to the number of CSI-RS ports or the number of DMRS ports comprises:
    when the number of CSI-RS ports or the number of DMRS ports is k, determining, by the terminal, the number of CQIs to be fed back as 1; when the number of CSI-RS ports or the number of DMRS ports is one of other values except k, determining the number of CQIs to be fed back as 2; k being an integer between 1 and ceil(N/2), including 1 and ceil(N/2), wherein N is a number of physical antennas or a number of antenna ports at the base station side, and ceil( ) is a ceiling function; or,
    when the number of CSI-RS ports or the number of DMRS ports is k, determining, by the terminal, the number of CQIs to be fed back as 1; when the number of CSI-RS ports or the number of DMRS ports is an integer between k+1 and ceil(N*2/3), including k+1 and ceil(N*2/3), determining the number of CQIs to be fed back as 2; when the number of CSI-RS ports or the number of DMRS ports is an integer between ceil(N*2/3)+1 and ceil(N), including ceil(N*2/3)+1 and ceil(N), determining the number of CQIs to be fed back as 3; k being an integer between 1 and ceil(N/2), including 1 and ceil(N/2), wherein N is a number of physical antennas or a number of antenna ports at the base station side, and ceil( ) is a ceiling function.

7. The method according to claim 1, further comprising: sending, by the terminal, at least one of a Sounding Reference Signal (SRS) or a CQI, to the base station; and determining, by the base station, the number of CQIs to be fed back by the terminal, according to the at least one of the SRS or the CQI.

8. The method according to claim 1, wherein each rank corresponds to a group of configuration parameters of the CSI-RS; the configuration parameters of the CSI-RS comprise: indexes of CSI-RS ports and a number of CSI-RS ports.

9. A method for determining a number of Channel Quality Indicators (CQI), CQI calculation and Rank Indicator (RI) calculation, comprising:
    determining, by a terminal, a number of CQIs to be reported by a User Equipment (UE), and the RI/CQI calculation according to at least one of the following pieces of information: a number of Channel State Information Reference Signal (CSI-RS) ports, configuration signaling of a base station, a system duplex mode, or pilot types;
    wherein determining the CQI calculation comprises: when the type of CSI-RS is precoded CSI-RS, determining, by the terminal, at least one of a number of ranks or the number of CQIs to be reported by the UE according to the number of CSI-RS ports, and calculating the CQI based on an assumption that spatial multiplexing is adopted on a downlink; when the type of CSI-RS is non-precoded CSI-RS, calculating, by the terminal, the CQI based on an assumption that a transmission diversity mode is adopted on the downlink.

10. The method according to claim 9, wherein the configuration signaling of the base station comprises: independently configuring, by the base station, at least one of determination of the number of CQIs, determination of the CQI calculation or determination of the RI calculation, for a plurality of CSI processes.

11. The method according to claim 9, wherein determining the CQI calculation comprises: when a system that the terminal accesses is a Time Division Duplex (TDD) system and the type of CSI-RS is the precoded CSI-RS, determining, by the terminal, at least one of the number of ranks or the number of CQIs to be reported by the UE according to the number of CSI-RS ports, and calculating the CQI based on an assumption that the spatial multiplexing is adopted on the downlink.

12. The method according to claim 9, wherein determining the RI calculation comprises: configuring, by the terminal, that each rank corresponds to a group of configuration parameters of the CSI-RS; the configuration parameters of the CSI-RS comprising indexes of CSI-RS ports and the number of CSI-RS ports.

* * * * *